(12) United States Patent
Nakamura et al.

(10) Patent No.: US 6,295,402 B1
(45) Date of Patent: Sep. 25, 2001

(54) NON-LINEAR OPTICAL SWITCH

(75) Inventors: Shigeru Nakamura; Kazuhito Tajima, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/440,164

(22) Filed: Nov. 15, 1999

(30) Foreign Application Priority Data

Nov. 16, 1998 (JP) .................................................. 10-325212

(51) Int. Cl.⁷ ...................................................... G02B 6/00
(52) U.S. Cl. ................................. 385/122; 385/16; 385/24
(58) Field of Search .................................... 385/16, 5, 24, 385/15, 122, 49, 8; 359/326, 332

(56) References Cited

U.S. PATENT DOCUMENTS 6,049,642 * 4/2000 Nakamura et al. ..................... 385/16

FOREIGN PATENT DOCUMENTS 10-115844    5/1998   (JP) .

* cited by examiner

Primary Examiner—Phan T. H. Palmer
(74) Attorney, Agent, or Firm—McGinn & Gibb, PLLC

(57) ABSTRACT

An optical switch is provided that utilizes a signal light frequency shift due to the resonance excitation non-linear optical effect in a semiconductor material so that a high extinction ratio optical switching operation can be realized with low energy controlling light pulses. The non-linear optical waveguide 1 receives a signal light pulse of a frequency of $\omega 1$ and a controlling light pulse of a frequency of $\omega 0$ and sets the pulse width of the controlling light pulse to a value smaller than that of the signal light pulse. The optical waveguide portion of the non-linear optical waveguide 1 is formed of a non-linear optical medium of which the non-linear refractive index changes due to absorption or amplification of the controlling light. The frequency $\omega 1$ of the signal light is set to the transparent region of the non-linear optical waveguide 1. When the frequency $\omega 0$ of the controlling light is set to the absorption region of the non-linear optical waveguide 1, some of signal light pulses incident together with the controlling lights partially frequency-shift toward the high-frequency area. The optical frequency filter 2 outputs only the frequency-shifted components. This allows the optical switching operation to be realized by controlling light pulses with low energies.

21 Claims, 3 Drawing Sheets

SIGNAL LIGHT TO 11

CONTROLLING LIGHT TO 11

SIGNAL LIGHT FROM 12

SIGNAL LIGHT TO 11

CONTROLLING LIGHT TO 11

SIGNAL LIGHT FROM 13

SIGNAL LIGHT TO 11

CONTROLLING LIGHT TO 11

SIGNAL LIGHT FROM 12

NON-LINEAR OPTICAL SWITCH

BACKGROUND OF THE INVENTION

The present invention relates to an optical switch, and more particularly to an optical switch used in the fields of optical fiber communication, optical information processing, and the like.

Recently, all-optical systems has been widely proposed for optical fiber communications and optical information processing. The research and development is being vigorously conducted to realize the all-optical systems. All-optical systems mean that signals propagate in the form of light through the transmission path, the multiplex/separation circuit, logic circuits, and the like within the system while not being subjected to a light-to-electric signal conversion or an electric signal-to-light conversion during the propagation.

Such an all-optical system requires elements controlling optical signals at high speeds. Conventionally, the method of performing optical control by electric signals has been employed for the optical control. However, an optical control by light (that is, all-optical control) is being recently taken notice of as a method of promising higher speed operation.

Particularly, the optical communication system where an ultra high-speed optical switch controlled by light (all-optical switch) is applied to the optical demultiplexer will be a breakthrough to realize a high-speed optical communication system.

In the all-optical switch, the most important performance is a high speed characteristic. Similarly, other performances are required regarding to low switching energy, high repetitive operation, compact size, and others.

Particularly, the switching energy is required to be within the light pulse energies deliverable from a semiconductor laser, fiber amplifier, or semiconductor light amplifier.

In order to realize those performances, the critical matter is the empirical rule that the figure of merit $\chi(3)/\tau\delta$ of a non-linear optical effect, being the drive principle of an all-optical switch, is nearly constant, where $\chi(3)$ is the size of the non-linearity, $\tau$ is a response time and $\delta$ is a signal loss.

The non-linear optical effect is roughly classified into a non-resonance excitation type and a resonance excitation type. It has been considered that it is difficult for either type to provide both high efficiency and high-speed. The non-resonance excitation type has a possible high-speed operation but the efficiency thereof is low.

Hence, a high-switching energy or a long interaction length is required. In contrast, the resonance type has a high efficiency but the relaxation of electrons actually excited in a non-linear optical medium is low. This problem makes it difficult to realize a high-speed operation.

The high efficiency of the resonance excitation type has been gaining renewed interest because of holding large appeal in a practice use. Recently, various methods have been proposed to overcome the problem on the slow relaxation. JP-A-No. 115844/1998, for instance, discloses an all-optical switch using the non-linear optical effect of the resonance excitation type.

The operation of an all-optical switch using the non-linear optical effect of the resonance excitation type will be described below. FIG. 5 is a block diagram illustrating the configuration of the optical switch, or all-optical switch, of FIG. 5. FIG. 6A is a waveform diagram of signal light to the port 11. FIG. 6B is a waveform diagram of signal light to the port 11. FIG. 6C is a waveform diagram of controlling light from the port 12.

A non-linear optical waveguide 1 receives a signal light pulse of a frequency of $\omega 1$ and a controlling light pulse of a frequency of $\omega 0$ through a signal light/controlling light input port 11. The frequency $\omega 1$ of the signal light is set to the transparent region of the non-linear optical waveguide 1. The non-linear optical waveguide 1 absorbs or amplifies the controlling light and changes the non-linear refractive index of the signal light.

As a result, the signal light is subjected to a non-linear phase shift and an optical frequency shift due to the non-linear phase shift in the non-linear optical waveguide 1. The non-linear optical waveguide 1 guides the signal light to the signal optical output port 12 via the optical frequency filter 2. The optical frequency filter 2 is set to pass the signal light pulse of which the center frequency is shifted by $\omega 2$.

A change in non-linear refractive index occurs by absorption or amplification of the controlling light within the non-linear optical waveguide 1. The controlling light absorption results in an increase in carriers in the non-linear optical waveguide. The controlling light amplification results in a decrease in carriers in the non-linear optical waveguide. In either case, a change in non-linear refractive index occurs by the number of carriers, thus resulting in a non-linear phase shift of the signal light.

A typical time characteristic to a non-linear phase shift ($\Delta\phi$) due to the resonance excitation contains an ultra high-speed rise following a controlling light pulse and a slow fall due to the carrier recombination.

Let us now consider a change in non-linear refractive index due to the controlling light absorption. In the case of the controlling light absorption type, the non-linear phase shift is approximately proportional to the number of carriers in the non-linear optical waveguide.

Hence, the time characteristic of the non-linear phase shift $\Delta\phi$ is expressed by the following rate equation:

$$d(\Delta\phi)/dt = G - d(\Delta\phi)/\tau \qquad (1)$$

where G is an amount proportional to an instantaneous strength of a controlling light pulse and $\tau$ is a relaxation time.

The time differential of a non-linear phase shift provides a frequency shift ($\Delta\omega$) of the signal light.

$$\Delta\omega = d(\Delta\phi)/dt \qquad (2)$$

When the non-linear phase shift occurs by excitation of a short controlling light pulse, only the first term of the rate equation contributes to the frequency shift and is expressed by the following equation.

$$\Delta\omega = d(\Delta\phi)/dt \sim G \qquad (3)$$

This means that a large frequency shift is provided only to the signal light incident together with the controlling light pulse. In the case of, for instance, controlling light with a pulse width of 3 ps, a large frequency shift is effected to the signal light for 3 ps. Since the falling time normally is on the order of ns, the frequency shift due to relaxation of a change in refractive index is two or three figures smaller than the frequency shift in the rise time of a change in refractive index.

The operation of the conventional optical switch will be described with reference to FIG. 6A, FIG. 6B and FIG. 6C.

A chain of signal light pulses to be input is obtained by data modulating a pulse chain of 160 GHz and with a pulse width of 2 ps. The chain of controlling light pulses has a pulse width of 3 ps and a repetitive frequency of 10 GHz.

The induced non-linear phase shift for the signal light pulse is $2\pi$. The frequency shift is provided only to the signal light pulse simultaneously input together with the controlling light pulse. The center frequency of the spectrum of frequency-shifted signal light pulses is $\omega 2$.

Under the above operational conditions, the shift ranging $\omega 1$ to $\omega 2$ is about 0.5 THz. The optical frequency filter 2 passes only the signal light pulse of which the center frequency is shifted to $\omega 2$ triggered by the controlling light pulse, to the output port 12. This feature allows a high-speed, high-efficiency full optical switch to be realized in a simplified configuration.

Both sides of the second equal sign of the equation (3) are integrated over time. Thus, it may be concluded that the non-linear phase shift $\Delta\phi$ excited by the controlling light is proportional to the amount G integrated over time, that is, a controlling light pulse energy.

The control optical pulse energy is considered by estimating a non-linear phase shift necessary for a switching operation. As understood from the first equal sign of the equation (3), the non-linear phase shift is expressed by the following formula.

$$\Delta\phi \sim \Delta\omega \times t0 \quad (4)$$

The non-linear phase shift is determined by a frequency shift to be provided for a signal light and by a controlling light pulse width.

The frequency shift necessary for an switching operation is set to a larger value than the spectrum width $\Delta\omega 1$ of a signal light such that the optical frequency filter can identify a frequency-shifted component from the other components.

$$\Delta\omega > \Delta\omega 1 \quad (5)$$

In the previous optical switch, the control light pulse width is set to a larger value than a signal light pulse width.

$$t0 > t1 \quad (6)$$

Hence, the formula (4) is expressed as follows:

$$\Delta\phi > \Delta\omega 1 \times t1 \quad (7)$$

The time waveform of a light pulse is combined with the spectrum waveform through a Fourier transform. It is well known that the product of the pulse width t1 of a signal light pulse and the spectrum width $\Delta\omega 1$ does not become less than a constant value. The pulse that provides a minimum product of a pulse width and a spectrum width is called a Fourier-transform limit pulse.

The inequality (7) expresses that the non-linear phase shift does not become less than the value obtained by substituting t1 and $\Delta\omega 1$ under the Fourier-transform limit condition of a signal pulse.

In an application of the optical switch to the optical separation circuit at the receiving terminal of the optical communication system, it must be considered that the signal light pulses propagating in a fiber are influenced by the group velocity dispersion and the non-linear optical effect and then are input to the optical switch.

In other words, it is considered that the pulse width t1 and the non-linear spectrum width $\Delta\omega 1$ of a signal light pulse spread during the propagation in a fiber so that the non-linear phase shift is deviated from the Fourier-transform limit condition.

In such a case, the non-linear phase shift necessary for the switching operation increases, as understood from the inequality (7). This means that the controlling light pulse energy increases.

SUMMARY OF THE INVENTION

The present invention is made to solve the above-mentioned problems.

Moreover, the objective of the invention is to provide an all-optical switch that includes a non-linear waveguide and a wavelength selector and operates on a low energy.

The objective of the present invention is achieved by an optical switch comprising means for inputting signal light and controlling light; an optical waveguide formed of a non-linear optical medium, the non-linear optical medium causing a change in non-linear refractive index due to absorption or amplification of the controlling light to provide an optical frequency shift to the signal light; and an optical frequency filter for passing optical frequency components shifted by a index in non-linear refractive change among signal light components output from the optical waveguide; the controlling light having a pulse width narrower than that of the signal light.

In the first aspect of the present invention, when a frequency shift of the signal light pulse is caused by absorption of the controlling light in the optical waveguide, the light frequency filter preferably comprises a short-wavelength pass filter. The optical waveguide consisted of the non-linear optical medium may be a non-linear waveguide with a light amplification effect to set the signal light wavelength to a gain region.

Moreover, according to the present invention, an optical switch comprises means for inputting signal light and controlling light; an optical waveguide formed of a non-linear optical medium, the non-linear optical medium causing a change in non-linear refractive index due to absorption or amplification of the controlling light to provide an optical frequency shift to the signal light; and means for diffracting optical frequency components at the time of inputting and optical frequency components shifted by a change in non-linear refractive index, among signal light components output from the optical waveguide, to different output ports; the controlling light having a pulse width narrower than that of the signal light.

The configuration of the diffracting means is not be restricted if the optical frequency component at the time of inputting and the optical frequency component shifted due to changes in non-linear refractive index, of signal light beams radiated from the optical waveguide, are diffracted to different output ports. An array waveguide grading grating, for instance, may be used as the diffracting means.

In the first and second aspects of the invention, the optical waveguide formed of a non-linear optical medium is not restricted in configuration. The optical waveguide, for instance, may be formed of a core layer of InGaAsP and a clad layer of InP. The core layer may be formed of an InGaAs/InGaAsP multiple quantum well structure formed on an InP substrate or of a GaAs series chemical compound semiconductor layer. When the width of a controlling light pulse is shorter than that of a signal light pulse, the condition defined by the inequality (6) is unnecessary.

Hence, the non-linear phase shift necessary for the optical switching operation of a signal light pulse satisfying the Fourier-transform limit condition is as follows:

$$\Delta\phi > \Delta\omega 1 \times t0$$

In comparison with the conventional optical switch previously described, the non-linear phase shift as well as the controlling light pulse energy proportional to the non-linear phase shift are respectively reduced to about t0/t1.

When the optical switch receives a signal light pulse of which the pulse width t1 or the spectrum width $\Delta\omega 1$ is spread from the Fourier-transform limit condition, the controlling light pulse energy is increased as $\Delta\omega 1$ increases. It is not needed to increase the controlling light pulse energy according to an increase of t1.

In the conventional optical switch, the whole of signal light pulses is frequency-shifted substantially. However, according to the present invention, the optical switch can be applied to the optical demultiplexer, or equivalents without any trouble although signal light pulses input together with controlling light pulses are partially frequency-shifted.

BRIEF DESCRIPTION OF THE DRAWINGS

This and other objects, features, and advantages of the present invention will become more apparent upon a reading of the following detailed description and drawings, in which.

DESCRIPTION OF THE EMBODIMENTS

An embodiment of the present invention will be described below in detail with reference to the attached drawings.

Figure 1:
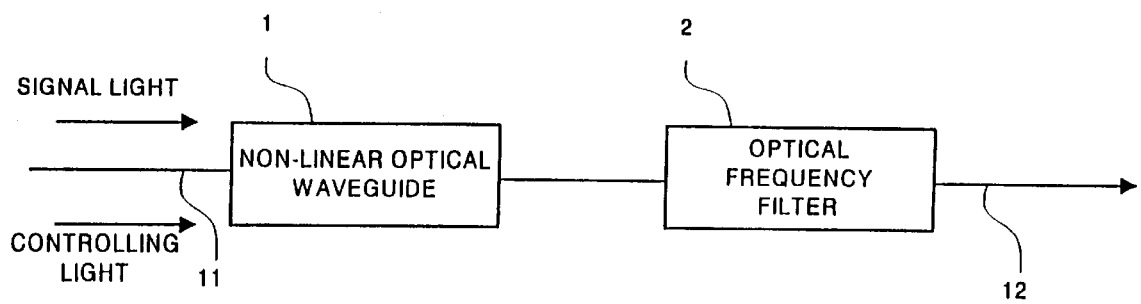
FIG. 1 is a block diagram illustrating the configuration of an optical switch according to a first embodiment of the present invention.
Figure 2A:
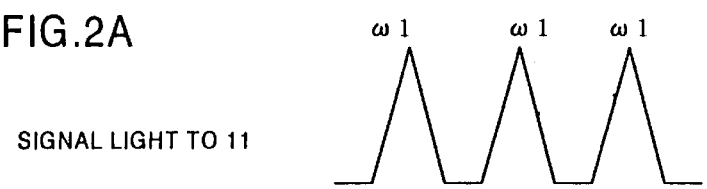
FIG. 2A is a waveform diagram of signal light pulses input to the signal light/controlling light input port 11 of the optical waveguide according to the first embodiment of the present invention.

Embodiment 1:

An embodiment of an optical switch according to the first aspect of the invention will be described here. FIG. 1 is a block diagram illustrating an optical switch according to the embodiment. FIG. 2A is a waveform diagram of the signal light input to the optical switch according to the embodiment. FIG. 2B is a waveform diagram of controlling light input to the optical switch according to the embodiment. FIG. 3C is a waveform diagram of a signal light output from the optical switch of the embodiment.

In the present embodiment, the optical switch consists of a non-linear optical waveguide 1 and an optical frequency filter 2. Signal light pulses of a frequency of $\omega 1$ and controlling light pulses of a frequency of $\omega 0$ are input into the signal light/controlling light port 11 of the non-linear optical waveguide 1. The frequency $\omega 1$ of the signal light is set to the transparent region of the non-linear optical waveguide 1.

The non-linear optical waveguide 1 absorbs or amplifies the controlling light and causes a change in non-linear refractive index thereof.

Thus, the signal light is subjected to a nonlinear phase shift and a frequency shift due to the non-linear phase shift in the non-linear optical waveguide 1. The optical frequency filter 2 passes the signal light outgoing from the non-linear optical waveguide 1 to the signal light output port 12. The optical frequency filter 2 passes light components having frequencies of more than $\omega 2$.

A change in non-linear refractive index occurs due to absorption or amplification of controlling light in the non-linear optical waveguide 1. The controlling light absorption increases carriers in the non-linear optical waveguide. The controlling light amplification decreases carriers in the non-linear optical waveguide. Even in either case, a change in non-linear refractive index occurs due to a change in the number of carriers so that a non-linear phase shift is provided to the signal light.

A typical time characteristic of a non-linear phase shift due to the resonance excitation includes an ultra-high speed rise following the controlling light pulse and a slow falling due to carrier recombination.

When a non-linear phase shift is excited due to a controlling light with a short pulse width, a large phase shift is provided to only the signal light input together with the controlling light pulse.

For instance, when a controlling light with a pulse width of 0.5 ps is used, a large frequency shift is provided to a signal light for about 0.5 picoseconds (ps). Since the rise time normally is in an order of nanoseconds (ns), the frequency shift involved in relaxation of a refractive index change is two or three figures smaller than the value in the rise of a refractive index change.

Figure 2:
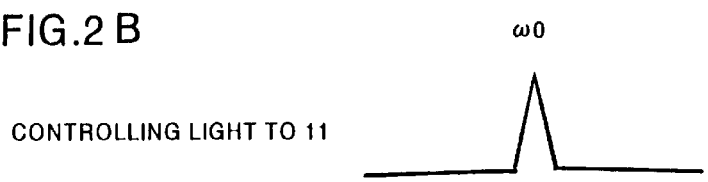
FIG. 2B is a waveform diagram of a controlling light pulse input to the signal light/controlling light input port 11 of the optical waveguide according to the first embodiment of the present invention.
FIG. 2C is a waveform diagram of a signal light pulse output from the signal light output port 12 of the optical waveguide according to the first embodiment of the present invention.
Figure 2C:

Next, the operation of the optical switch will be described below referring to FIG. 2.

The signal light pulse chain to be input is obtained by data modulating a pulse chain which has a repetitive frequency of 160 GHz and a pulse width of 2 ps. The controlling light pulse chain has a pulse width of 0.5 ps and a repetitive frequency of 10 GHz.

As previously described, part of signal light pulses input together with the controlling light pulses shifts toward high-frequency side of the optical frequency. The optical frequency filter 2 passes only the signal light components shifted toward the high frequency side from the output port 12. This allows a high-speed, high-efficiency full optical switch to be realized in a slim configuration.

Example in Embodiment 1:

The configuration of an optical switch according to the embodiment 1 will be described in more detail.

The non-linear waveguide 1 is a buried-type semiconductor optical waveguide including InGaAsP acting as a core and InP acting as a cladding. In order to fabricate the semiconductor optical waveguide, InGaAsP is first grown on an InP substrate using the metal organic vapor phase epitaxy (MOVPE) technique. The grown layer is patterned in a stripe shape using the photolithography and the wet etching technique. Using the MOVPE technique, an InP layer is grown on the shaped pattern to bury the InGaAsP.

The antireflection coating is provided on both end surfaces of the optical waveguide. The optical waveguide formed of InGaAsP has an absorption edge wavelength of 1.500 μm, a thickness of 0.3 μm, a width of 1 μm, and a length of 300 μm.

The optical frequency filter 2 is a high-pass filter (short-wave pass filter) which has a maximum transparence of 10% at a wavelength of 1.547 μm, a maximum transparence of 50% at a wavelength of 1.546 μm, and a maximum transparence of 90% at a wavelength of 1.545 μm.

The controlling light has a pulse width of 0.5 ps and a wavelength of 1.500 μm. The waveguide is set to the absorption region of the InGaAsP acting as the core of the non-linear optical waveguide 1. The signal light has a pulse width of 2 ps, a spectrum width of 1.3 nm, and a wavelength of 1.550 μm. The wavelength is set to the transparent region of the optical wave-guiding portion of the non-linear optical waveguide 1.

The non-linear phase of the signal light pulse is shifted by π/2. Part of signal light pulses input together with the controlling light pulses are frequency-shifted toward the high-frequency side. The maximum frequency shift is 0.5 THz. In comparison with the conventional optical switch, the non-linear phase shift necessary for an occurrence of a frequency shift is reduced to ¼ because the width of the controlled pulse is reduced from 2 ps to 0.5 ps.

The energy of a control light pulse necessary for the optical switching operation is nearly proportional to the non-linear phase shift. Therefore, the optical switch of the present invention can operate on a lower energy, compared with conventional optical switch.

Figure 3:
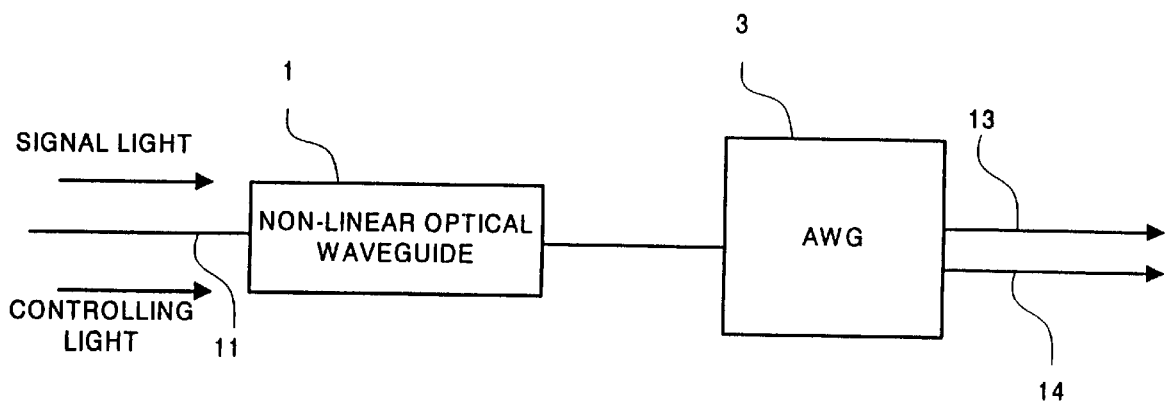
FIG. 3 is a block diagram illustrating the configuration of an optical switch according to a second embodiment of the present invention.
Figure 4A:
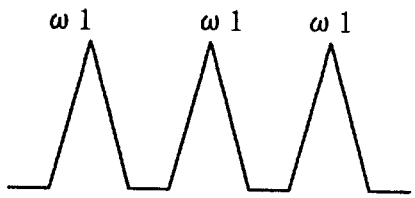
FIG. 4A is a waveform diagram of signal light pulses input to the signal light/controlling light input port 11 of the optical waveguide according to the second embodiment of the present invention.
Figure 4B:
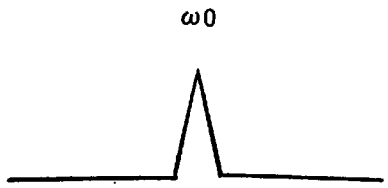
FIG. 4B is a waveform diagram of a controlling light pulse input to the signal light/controlling input port 11 of the optical waveguide according to the second embodiment of the present invention.
Figure 4C:
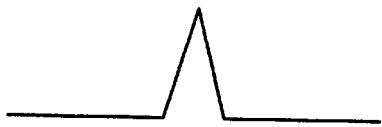
FIG. 4C is a waveform diagram of a signal light pulse output from the signal light output port 13 of the optical waveguide according to the second embodiment of the present invention.
Figure 5:
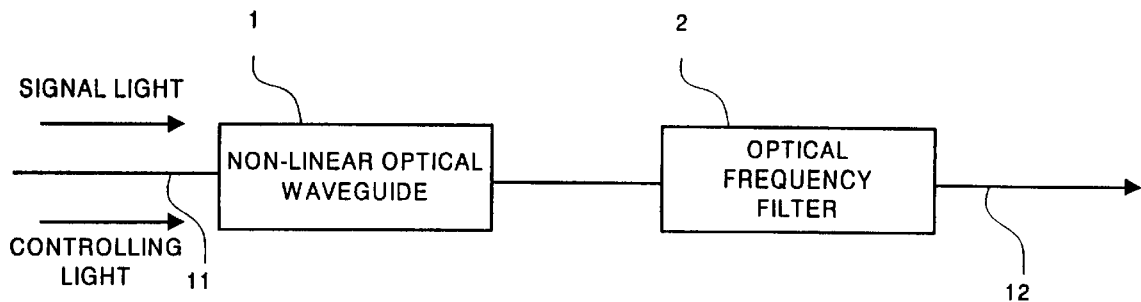
FIG. 5 is a block diagram illustrating the configuration of a conventional optical switch.
Figure 6A:
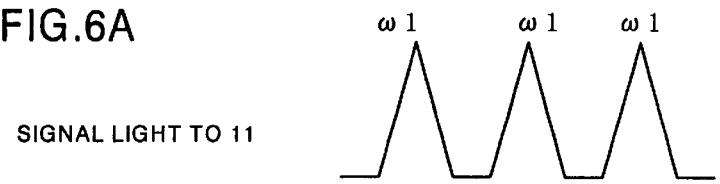
FIG. 6A is a waveform diagram of signal light pulses input to the signal light/controlling light input port 11 of the conventional optical switch.
Figure 6B:
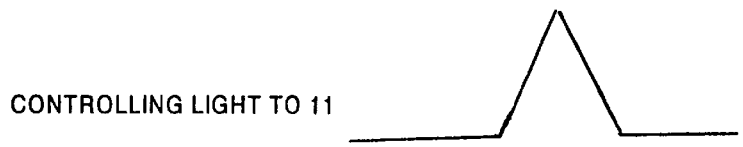
FIG. 6B is a waveform diagram of a controlling light pulse input to the signal light/controlling light input port 11 of the conventional optical switch.
Figure 6C:
FIG. 6C is a waveform diagram of a signal light pulse output from the signal light output port 12 of the conventional optical switch.

Embodiment 2:

The second embodiment relates to an optical switch according to the second aspect of the invention. FIG. 3 is a block diagram illustrating the configuration of the optical switch of the second embodiment. FIG. 4A is a waveform of signal light input to the optical switch of the second embodiment. FIG. 4B is a waveform of controlling light input to the optical switch of the second embodiment. FIG. 4C is a waveform of signal light output from the optical switch of the second embodiment.

The optical switch consists of a non-linear waveguide 1 and an array waveguide grating (AWG) 3. A signal light pulse of a frequency of ω1 and a controlling light pulse of a frequency of ω0 are input to the signal light/controlling light input port 11 of the non-linear waveguide 1. The frequency ω1 of the signal light is set to the transparent region of the non-linear optical waveguide 1.

The non-linear waveguide 1 absorbs or amplifies the controlling light and causes a change in non-linear refractive index.

The non-linear optical waveguide 1 subjects the signal light to a non-linear phase shift and to a frequency shift due to the non-linear phase shift. The AWG 3 diffracts the signal light from the non-linear optical waveguide 1 and then outputs different light frequency components out of different signal light output ports.

Next, the operation of the optical switch of the second embodiment will be described below by referring to FIG. 4. The signal light pulse chain is obtained by data-modulating a pulse chain which has a pulse width of 2 ps and a repetitive frequency of 160 GHz. The controlling light pulse chain has a pulse width of 0.5 ps and a repetitive frequency of 10 GHz.

The non-linear phase of the signal light pulse is shifted by π/2. Part of the signal light pulses input together with the controlling light pulses are frequency-shifted toward the high-frequency side. The AWG 3 outputs components of the frequency ω1 from the signal light output port 14 and the frequency shifted components from the signal light output port 13. This allows a high-speed, high efficiency optical switch to be realized in a simplified configuration.

Example in the second embodiment 2:

The configuration of an optical switch in the second embodiment will be described here in more detail.

Like the example in the first embodiment, the non-linear optical waveguide 1 is a buried-type semiconductor waveguide including InGaAsP acting as a core and InP acting as a clad. The controlling light has a pulse width of 0.5 ps and a wavelength of 1.500 μm. The wavelength is set to the absorption region of the InGaAsP forming the core of the non-linear optical waveguide 1.

The signal light has a pulse width of 2 ps, a spectrum width of 1.3 nm, and a wavelength of 1.550 μm. The wavelength is set to the transparent region of the optical portion of the non-linear optical waveguide 1.

Part of the signal light pulses input together with the controlling light pulses are frequency-shifted toward the high frequency side. The maximum shift is 0.5 THz. The AWG 3 outputs the components of a wavelength of 1.550 μm out of the signal light output port 13 and the components having a wavelength shifted toward the short wavelength side out of the signal light output port 14.

This enables an optical switching operation.

In the first and second embodiments, the optical switch uses a semiconductor non-linear waveguide formed of InGaAsP acting a core and InP acting a clad. According to the present invention, an equivalent optical switch may be fabricated by using a core with an InGaAs/InGaAsP multiple quantum well structure which can be formed on the InP substrate or using a semiconductor non-linear waveguide formed of other material applicable to the GaAs substrate.

The combination of a semiconductor non-linear waveguide and an optical frequency filter or AWG has been exemplified. However, according to the present invention, a similar effect can be obtained by using other elements, for instance, monolithic optical circuits fabricated on a semiconductor substrate.

The signal light wavelength is not restricted to the transparent region of the non-linear waveguide. With a non-linear waveguide having the optical amplification effect, a similar effect can be obtained even when the signal light wavelength is set to the gain region.

As described above, according to the present invention, the pulse width of the controlling light is set to a narrower value than that of the signal light so that the optical switch can operate by controlled pulses with low energies.

The entire disclosure of Japanese Application No. 10-325212 filed Nov. 16, 1998 including specification, claims, drawing and summary are incorporated herein by reference in its entirely.

What is claimed is:

1. An optical switch comprising:

means for inputting signal light and controlling light;

an optical waveguide formed of a non-linear optical medium, said non-linear optical medium causing a change in non-linear refractive index due to absorption or amplification of said controlling light to provide an optical frequency shift to said signal light; and an optical frequency filter for passing optical frequency components shifted by a change in non-linear refractive index among signal light components output from said optical waveguide, said controlling light having a pulse width narrower than that of said signal light.

2. The optical switch defined in claim 1, wherein said optical frequency filter comprises a short-wave pass filter when said optical waveguide frequency-shifts said signal light due to absorption of said controlling light.

3. The optical switch defined in claim 1, wherein said optical waveguide formed of said non-linear optical medium comprises a non-linear waveguide having an optical amplification effect; and wherein the wavelength of said signal light is set to a gain region.

4. The optical switch defined in claim 1, wherein said optical waveguide formed of said non-linear optical medium comprises a core layer formed of InGaAsP and a clad layer formed of InP.

5. The optical switch defined in claim 1, wherein said optical waveguide formed of said non-linear optical medium comprises an InGaAs/InGaAsP multi-well quantum structure formed on an InP substrate.

6. The optical switch defined in claim 1, wherein said optical waveguide formed of said non-linear optical medium comprises a GaAs series compound semiconductor.

7. The optical switch defined in claim 1, wherein a phase shift is provided exclusively to said signal light input with said controlling light.

8. The optical switch defined in claim 1, wherein a controlling light pulse energy is increased in proportion to an increase in a spectrum width.

9. The optical switch defined in claim 1, wherein said optical waveguide includes a core layer of InGaAsP.

10. The optical switch defined in claim 1, wherein said optical waveguide includes a clad layer formed of InP.

11. An optical switch comprising:

means for inputting signal light and controlling light;

an optical waveguide formed of a non-linear optical medium, said non-linear optical medium causing a change in non-linear refractive index due to absorption or amplification of said controlling light to provide an optical frequency shift to said signal light; and means for diffracting optical frequency components at the time of inputting and optical frequency components shifted by a change in non-linear refractive index, among signal light components output from said optical waveguide, to different output ports, said controlling light having a pulse width narrower than that of said signal light.

12. The optical switch defined in claim 11, wherein said diffraction means comprises an array waveguide grating.

13. The optical switch defined in claim 11, wherein a phase shift is provided exclusively to said signal light input with said controlling light.

14. The optical switch defined in claim 11, wherein said optical waveguide formed of said non-linear optical medium comprises a core layer formed of InGaAsP and a clad layer formed of InP.

15. The optical switch defined in claim 7, wherein a controlling light pulse energy is increased in proportion to an increase in a spectrum width.

16. The optical switch defined in claim 11, wherein said optical waveguide formed of said non-linear optical medium comprises an InGaAs/InGaAsP multi-well quantum structure formed on an InP substrate.

17. The optical switch defined in claim 11, wherein said optical waveguide formed of said non-linear optical medium comprises a GaAs series compound semiconductor.

18. An optical switch comprising:

an optical waveguide;

an input device for inputting signal light and controlling light to said optical waveguide; and an optical frequency filter connected to said optical waveguide, wherein said optical waveguide is formed of a non-linear optical medium causing a change in non-linear refractive index due to absorption or amplification of said controlling light to provide an optical frequency shift to said signal light, wherein said optical frequency filter passes optical frequency components shifted by a change in non-linear refractive index among signal light components output from said optical waveguide, and wherein said controlling light has a pulse width narrower than that of said signal light.

19. The optical switch defined in claim 18, wherein said optical waveguide formed of said non-linear optical medium comprises a core layer formed of InGaAsP and a clad layer formed of InP.

20. The optical switch defined in claim 18, wherein said optical waveguide formed of said non-linear optical medium comprises an InGaAs/InGaAsP multi-well quantum structure on an InP substrate.

21. The optical switch defined in claim 18, wherein said optical waveguide formed of said non-linear optical medium comprises a GaAs series compound semiconductor.

* * * * *